(12) United States Patent
Kobylak et al.

(10) Patent No.: US 7,543,155 B1
(45) Date of Patent: Jun. 2, 2009

(54) METHOD FOR DEVELOPING A PASSWORD BASED ON BIOMETRIC TEMPLATE

(75) Inventors: Adriana Kobylak, Round Rock, TX (US); John S. Langford, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/023,624

(22) Filed: Jan. 31, 2008

(51) Int. Cl.
*G06F 12/14* (2006.01)
(52) U.S. Cl. ....................... 713/184; 713/186
(58) Field of Classification Search .......... 713/182, 713/183, 184, 186
See application file for complete search history.

(56) References Cited

U.S. PATENT DOCUMENTS

| | | | | |
|---|---|---|---|---|
| 6,151,593 | A * | 11/2000 | Cho et al. | 706/16 |
| 6,983,061 | B2 * | 1/2006 | Ikegami et al. | 382/115 |
| 7,272,380 | B2 * | 9/2007 | Lee et al. | 455/410 |
| 2004/0187037 | A1 * | 9/2004 | Checco | 713/202 |
| 2006/0026439 | A1 | 2/2006 | Moseley | |
| 2006/0271790 | A1 * | 11/2006 | Chen | 713/185 |
| 2007/0220274 | A1 * | 9/2007 | Jensen et al. | 713/186 |
| 2008/0098222 | A1 * | 4/2008 | Zilberman | 713/170 |
| 2008/0172715 | A1 * | 7/2008 | Geiger et al. | 726/1 |

OTHER PUBLICATIONS

User Authentication Through Typing Biometrics Features by Livia C. F. Araujo, Luiz HR. Sucupira Jr., Miguel G. Lizarraga, Lee L. Ling, and Joao B T. Yabu-Uti Published by IEEE in 2005.*
Verification of Computer Users Using Keystroke Dynamics IEEE 1997.*
Computer-Access Security System Using Keystroke Dynamics IEEE 1990.*
A Multi-Technique Approach for User Identification through Keystroke Dynamics IEEE 2000.*
Computer-Access Authentication with Nerual Network Based Keystroke Idenetiy Verification IEEE 1997.*
Dynamic Keystroke Analysis Using AR Model IEEE—2004.*
Ozlem Guven, et al., Enhanced Password Authentication Through Keystroke Typing Characteristics, ISBN, Feb. 12-14, 2007, pp. 317-322.
Saleh Bleha, et al., Computer-Access Security Systems Using Keystroke Dynamics, IEEE Transactions on Pattern Analysis and Machine Intelligence, vol. 12, No. 12, Dec. 1990, pp. 1217-1220.

* cited by examiner

*Primary Examiner*—Ellen Tran
(74) *Attorney, Agent, or Firm*—Cantor Colburn LLP; Libby Handelsman

(57) ABSTRACT

A method for developing a password based on a biometric template via a graphical user interface (GUI). The method includes receiving a password request input by a user via the graphical user interface, receiving a passphrase input by the user and simultaneously obtaining data associated with keystroke dynamics of a user while the user inputs the passphrase, creating a biometric template based upon the data obtained and keystroke dynamics data of the user collected over a predetermined period of time, generating the password based on the biometric template created and the passphrase inputted, and displaying the generated password to the user via the graphical user interface.

1 Claim, 2 Drawing Sheets

METHOD FOR DEVELOPING A PASSWORD BASED ON BIOMETRIC TEMPLATE

BACKGROUND OF THE INVENTION

Field of the Invention

This invention relates to a method for developing a password, and particularly to a method for developing a password based on a created biometric template of a user.

DESCRIPTION OF BACKGROUND

Access security for computer systems has become a very important issue in the field of computer technology. Passwords are required for security authentication of users, in order for the users to gain access to confidential information, accounts, etc. Various methods have been implemented which enable random password generation for users. One method offers a graphical user interface (GUI) where via a command prompt, a user makes a password generation request. The user inputs a desired number of letters, numbers and symbols that the user would like have included in a generated password. For example, if a user inputs 3 letters, 2 numbers and 1 symbol, a password such as "a3b2c&" may be generated and displayed the user via the GUI. Thus, the resulting password includes a random mixture of characters. One disadvantage associated with randomly generating passwords, is that the generated password may be difficult for the user to remember and type, and therefore, it may be time consuming for the user to enter the password and gain access the computer system.

Another method discloses the use of a GUI to generate passwords by randomly selecting three-letter sequences from words in an English dictionary. A list of pronounceable passwords are generated and displayed to the user via the GUI. For example, from the words "jack" and "people", a password "jacpeo" may be generated. One disadvantage associated with this method is that although the password may be easy to remember, the password may be difficult for a user to type and the lack of numbers or special characters in the resultant password makes the password unsecured and easier to be guessed by others.

SUMMARY OF THE INVENTION

The shortcomings of the prior art are overcome and additional advantages are provided through the provision of a method for developing a password based on a biometric template. The method includes receiving a password request input by a user via the graphical user interface (GUI), receiving a passphrase input by the user and simultaneously obtaining data associated with keystroke dynamics of a user while the user inputs the passphrase, creating a biometric template based upon the data obtained and keystroke dynamics data of the user collected over a predetermined period of time, generating the password based on the biometric template created and the passphrase inputted, and displaying the generated password to the user via the GUI.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

Embodiments of the present invention create a password based upon a passphrase inputted by a user and a biometric template created based upon keystroke dynamics obtained while the user inputs the passphrase and keystroke dynamics data of a user collected over a predetermined period of time.

As a result of the summarized invention, technically we have achieved a solution which enables a password to be generated which can be easily remembered and typed by a user and which is less likely to be guessed by others. Additional advantages of the present invention include the ease to remember the password generated resulting in faster typing time of the password and decreased potential of exposure to others, and the password is more difficult to guess compared to a "word" password.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Biometrics is the use of an individual's physiological or behavioral characteristics to uniquely identify that individual. Keystroke dynamics is a form of biometrics which refers to timing information or data collected concerning a user's typing pattern while using a computer keyboard.

Figure 1:
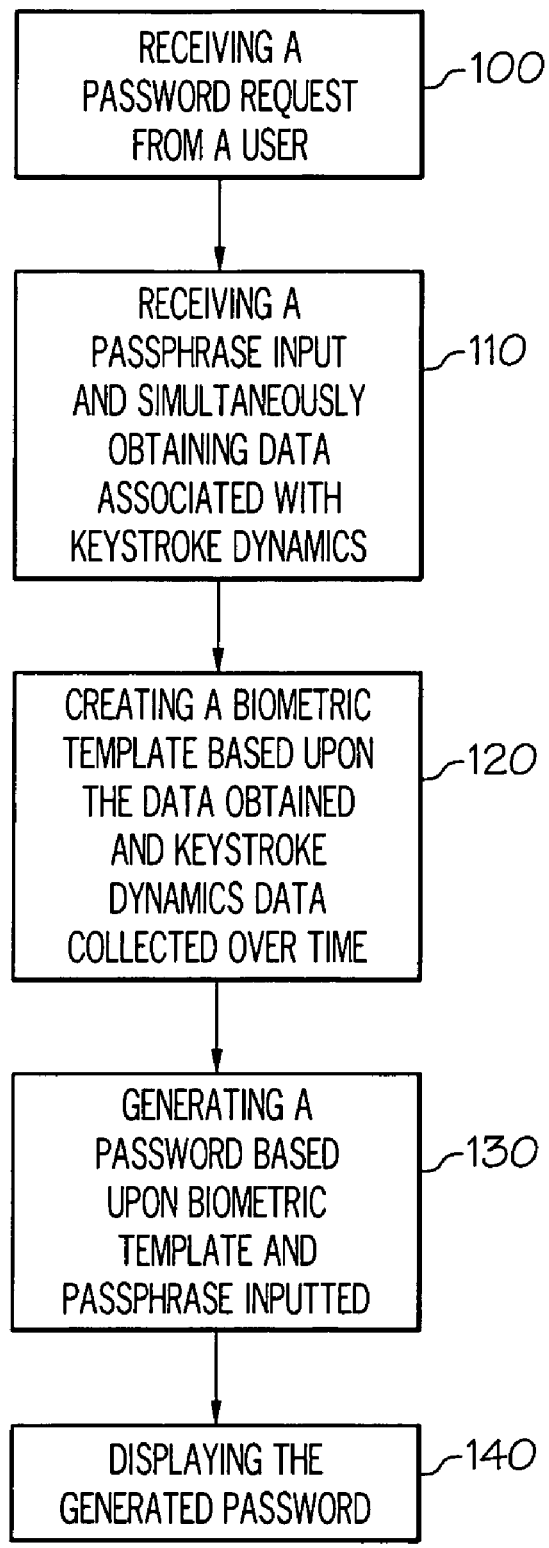
FIG. 1 is a flowchart illustrating a method for developing a password that can be implemented within embodiments of the present invention.

Turning now to the drawings in greater detail, it will be seen that in FIG. 1 there is a flowchart illustrating a method for developing a password based on a biometric template of a user. The method may be implemented via a personal computer (PC), for example, where at operation 100, a user requests a password to be generated via a graphical user interface (GUI) of the PC and the password request is received. From operation 100, the process moves to operation 110, where a user is then asked to input a passphrase and the passphrase input is received. A passphrase is a sequence of words or other text. According to an exemplary embodiment, the passphrase inputted is of a specified length or number of words. For example, the passphrase may only be five words or include 40 characters. However, the present invention is not limited hereto and may vary as necessary. Further, in order to generate a useful result, the passphrase should be meaningful to the user.

As the user inputs the passphrase in operation 110, data associated with keystroke dynamics of a user is simultaneously obtained. That is, while the user inputs the passphrase, data is collected associated with the user's typing pattern. For example, data such as the speed at which the user types the passphrase and whether there are delays between each of the user's keystrokes when typing certain characters. The smaller the time delay between characters is an indication of the user's ease in typing certain character sequences, such as "as", "io", and "gh", for example.

From operation 110, the process moves to operation 120, where a biometric template is created based on the data obtained and keystroke dynamics data of the user which has been collected over a predetermined period of time and stored. According to an exemplary embodiment, the stored keystroke dynamics data is also necessary as the passphrase alone may not fully represent the biometric template of the user since the passphrase is a very small sample of the typing pattern of the user. The keystroke dynamics data is collected every time the user uses the keyboard by a process running on a background of the computer. A biometric template is data associated with keystroke dynamics of a user which is stored in a database on a user's computer, for example.

According to an exemplary embodiment, the biometric template is dynamically updated over a period of time. Further, according to an exemplary embodiment, the biometric template is created by comparing the keystroke dynamics data of the user with predetermined reference data stored in a database on the computer. The predetermined reference data is statistical data associated with latencies between keystrokes and durations of keystrokes used as a measure to differentiate between users.

According to an exemplary embodiment, the data associated with keystroke dynamics of a user is obtained by performing real-time measurements of time durations between keystrokes when the passphrase is inputted by the user.

From operation 120, the process moves to operation 130, where a password is generated based upon the biometric template created and the passphrase inputted, and from operation 120, the process moves to operation 140, where the generated password is then displayed to the user via the GUI.

Examples of password generation using according to an exemplary embodiment of the present invention will now be described. If the user requests a password and is asked to input a passphrase, and the user inputs "Innovation that matters". Based upon a user's biometric template which includes data associated with keystroke dynamics of a user while the user types the passphrase "Innovation that Matters" and keystroke dynamics data collected over time, it may be determined that the user easily types continuous letters on a computer keyboard such as "A" and "S" and that the user uses the index finger followed by either the ring finger or the little finger when typing. Therefore, a resulting password such as "ionovaer" may be created. The password "ionovaer" includes "io" which consists of two continuous letters on the keyboard, "no" which is typed using the index finger followed by the ring finger, "va" which is typed using the index finger followed by the little finger, and "er" which consists of two continuous letters on the keyboard.. Another example, if the user request a password and inputs the passphrase "All roads lead to Rome", based on the user's biometric template, it may be determined that the user easily types a letter from the left side of the keyboard followed by one on the right side of the keyboard and vice versa, i.e., one hand followed by the other hand. Therefore, a password such as "alroldme" may be generated. According to the current exemplary embodiment, all-letter passwords have been used in the examples to make them easier to visualize. However, the present invention is not limited hereto, and numbers and special characters may also be used.

According to an exemplary embodiment of the present invention, a standard keyboard layout is utilized. However, the present invention is not limited hereto and may vary as necessary.

Since a unique biometric template is created for each individual, a password generated will vary from person to person. That is, although two individuals input the same passphrase, different passwords will be generated because of each individual's biometric template created.

The capabilities of the present invention can be implemented in software, firmware, hardware or some combination thereof.

As one example, one or more aspects of the present invention can be included in an article of manufacture (e.g.., one or more computer program products) having, for instance, computer usable media. The media has embodied therein, for instance, computer readable program code means for providing and facilitating the capabilities of the present invention. The article of manufacture can be included as a part of a computer system or sold separately. This method has the advantage of not requiring a specially designed device or complex software, in order to be implemented.

Additionally, at least one program storage device readable by a machine, tangibly embodying at least one program of instructions executable by the machine to perform the capabilities of the present invention can be provided.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

Figure 2:
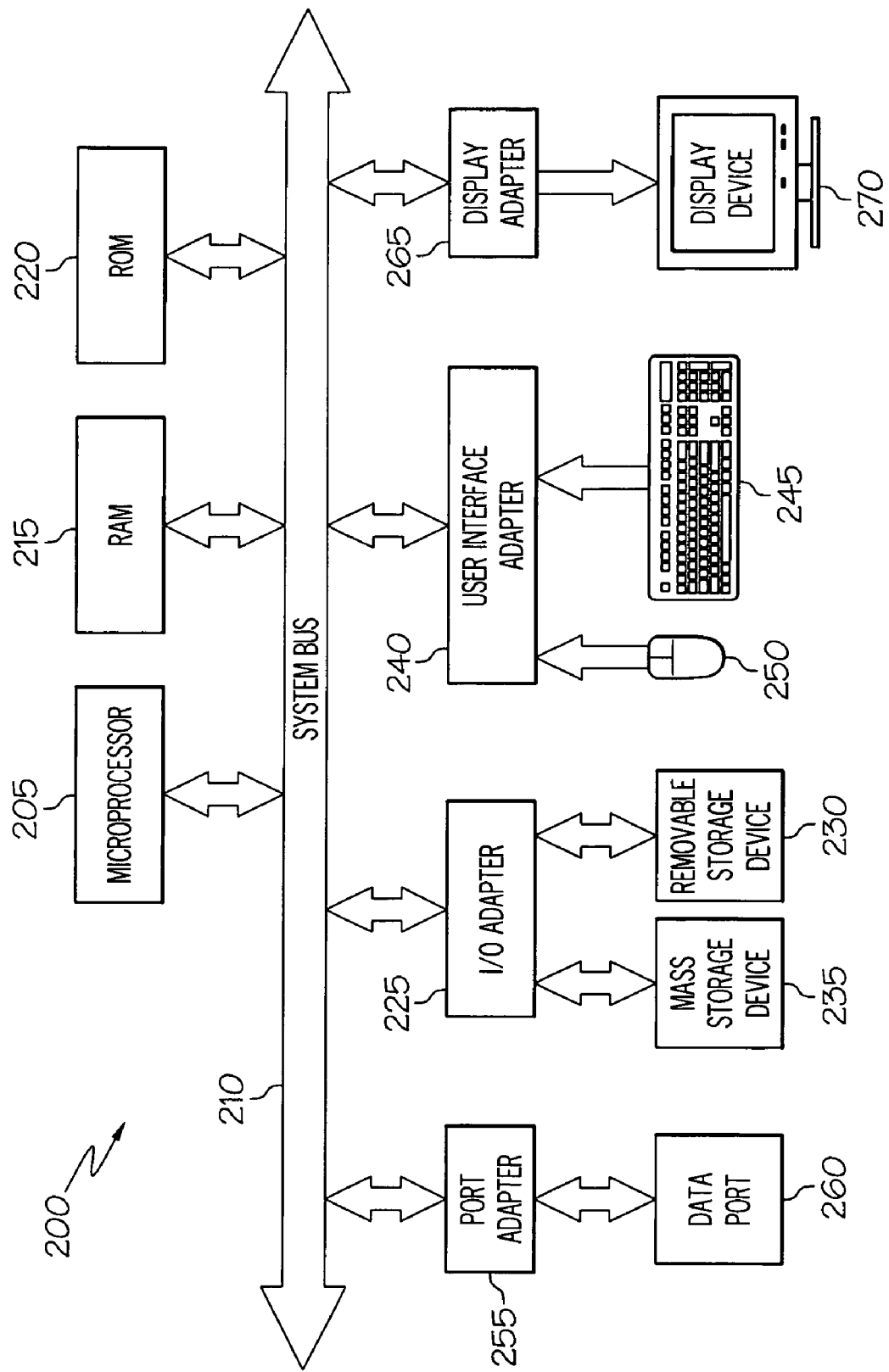
FIG. 2 is a schematic block diagram of a general-purpose computer suitable for practicing the present invention embodiments.

Generally, the method for developing a password based on a biometric template described herein is practiced with a general-purpose computer and the method may be coded as a set of instructions on removable or hard media for use by the general-purpose computer. FIG. 2 is a schematic block diagram of a general-purpose computer suitable for practicing the present invention embodiments. In FIG. 2, computer system 200 has at least one microprocessor or central processing unit (CPU) 205. CPU 205 is interconnected via a system bus 210 to a random access memory (RAM) 215, a read-only memory (ROM) 220, an input/output (I/O) adapter 225 for a connecting a removable data and/or program storage device 230 and a mass data and/or program storage device 235, a user interface adapter 240 for connecting a keyboard 245 and a mouse 250, a port adapter 255 for connecting a data port 260 and a display adapter 265 for connecting a display device 270.

ROM 220 contains the basic operating system for computer system 200. The operating system may alternatively reside in RAM 215 or elsewhere as is known in the art. Examples of removable data and/or program storage device 230 include magnetic media such as floppy drives and tape drives and optical media such as CD ROM drives. Examples of mass data and/or program storage device 235 include hard disk drives and non-volatile memory such as flash memory. In addition to keyboard 245 and mouse 250, other user input devices such as trackballs, writing tablets, pressure pads, microphones, light pens and position-sensing screen displays may be connected to user interface 240. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 230, fed through data port 260 or typed in using keyboard 245.

In view of the above, the present method embodiment may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for developing a password based on a biometric template via a graphical user interface, the method comprising:

receiving a request that a password be generated that is input by a user via the graphical user interface and responsively issuing a passphrase input request to the user;

receiving the passphrase input, having a first character sequence, by the user and simultaneously obtaining data associated with keystroke dynamics of the user while the user inputs the passphrase;

creating a biometric template based upon the data obtained and keystroke dynamics data of the user collected over a predetermined period of time;

analyzing the biometric template to identify continuous character combinations the user types easily;

in accordance with the analyzing of the biometric template, modifying the first character sequence of the inputted passphrase with the continuous character combinations the user types easily to thereby generate the password, the password having a second character sequence, which is different from the first character sequence; and displaying the generated password to the user via the graphical user interface.

* * * * *